(12) United States Patent
Jung et al.

(10) Patent No.: US 12,476,094 B2
(45) Date of Patent: Nov. 18, 2025

(54) MODEL-BASED CHARACTERIZATION OF PLASMAS IN SEMICONDUCTOR PROCESSING SYSTEMS

(71) Applicant: Applied Materials, Inc., Santa Clara, CA (US)

(72) Inventors: Soonwook Jung, Campbell, CA (US); Kenneth D. Schatz, Los Altos, CA (US); Hunkee Cho, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 993 days.

(21) Appl. No.: 17/486,473

(22) Filed: Sep. 27, 2021

(65) Prior Publication Data

US 2023/0096706 A1 Mar. 30, 2023

(51) Int. Cl.
- *G05B 19/418* (2006.01)
- *G05B 19/4099* (2006.01)
- *H01J 37/32* (2006.01)

(52) U.S. Cl.
CPC .... *H01J 37/32972* (2013.01); *G05B 19/4099* (2013.01); *G05B 19/41875* (2013.01); *H01J 37/32183* (2013.01); *H01J 37/3299* (2013.01); *G05B 2219/32368* (2013.01); *H01J 2237/24592* (2013.01)

(58) Field of Classification Search
None
See application file for complete search history.

(56) References Cited

U.S. PATENT DOCUMENTS

| | | | |
|---|---|---|---|
| 6,245,189 B1 * | 6/2001 | Rigali | H01L 21/67751 118/723 R |
| 2003/0113945 A1 | 6/2003 | Kagoshima et al. | |
| 2003/0218427 A1 | 11/2003 | Hoffman et al. | |
| 2005/0154482 A1 | 7/2005 | Tomoyasu | |
| 2008/0063810 A1 * | 3/2008 | Park | C23C 16/4401 118/715 |
| 2008/0099450 A1 * | 5/2008 | Lewington | H01J 37/32165 219/121.58 |

(Continued)

FOREIGN PATENT DOCUMENTS

| | | |
|---|---|---|
| EP | 3789826 A1 | 3/2021 |
| TW | 201021628 A | 6/2010 |

(Continued)

OTHER PUBLICATIONS

Application No. PCT/US2022/044368, International Search Report and Written Opinion, Mailed On Jan. 12, 2023, 10 pages.

*Primary Examiner* — Jason Lin
(74) *Attorney, Agent, or Firm* — Kilpatrick Townsend & Stockton LLP

(57) ABSTRACT

A method of characterizing plasmas during semiconductor processes may include receiving operating conditions for a semiconductor process, where the semiconductor process may be configured to generate a plasma inside of a chamber of a semiconductor processing system. The method may also include providing the operating conditions for the semiconductor process as inputs to a model, where the model may have been trained to characterize plasmas in the chamber. The method may also include generating, using the model, a characterization of the plasma in the chamber resulting from the operating conditions of the semiconductor process.

17 Claims, 11 Drawing Sheets

(56) References Cited

U.S. PATENT DOCUMENTS

| | | | | |
|---|---|---|---|---|
| 2008/0102001 | A1* | 5/2008 | Chandrachood | H01J 37/32963 422/129 |
| 2008/0210376 | A1* | 9/2008 | Maeda | H01J 37/32082 118/712 |
| 2011/0070665 | A1* | 3/2011 | Chen | H01J 37/32935 257/E21.528 |
| 2017/0133202 | A1* | 5/2017 | Berry, III | C23C 16/45565 |
| 2019/0164852 | A1* | 5/2019 | Peng | H01L 21/67253 |
| 2020/0273732 | A1* | 8/2020 | Nakada | G05B 13/0265 |
| 2021/0125814 | A1* | 4/2021 | Sato | H01J 37/3222 |
| 2021/0343520 | A1* | 11/2021 | Qian | H01J 37/32899 |
| 2022/0037135 | A1* | 2/2022 | Kapoor | H05H 1/0025 |
| 2022/0084794 | A1* | 3/2022 | Collins | C23C 16/505 |
| 2022/0270901 | A1* | 8/2022 | Sadeghi | H01L 21/67161 |
| 2023/0012173 | A1* | 1/2023 | Dobashi | G06T 11/00 |
| 2023/0062662 | A1* | 3/2023 | Suzuki | G01J 3/443 |
| 2023/0078146 | A1* | 3/2023 | Rao | H01L 21/67253 703/1 |

FOREIGN PATENT DOCUMENTS

| | | | |
|---|---|---|---|
| TW | 202040412 | A | 11/2020 |
| TW | 202046007 | A | 12/2020 |
| TW | 202119138 | A | 5/2021 |
| WO | 2006078851 | A2 | 7/2006 |

* cited by examiner

MODEL-BASED CHARACTERIZATION OF PLASMAS IN SEMICONDUCTOR PROCESSING SYSTEMS

BACKGROUND

Integrated circuits are made possible by processes that produce intricately patterned material layers on substrate surfaces. Producing patterned material on a substrate requires controlled methods for removal of exposed material. For example, chemical etching is used for a variety of purposes including transferring a pattern in photoresist into underlying layers, thinning layers, or thinning lateral dimensions of features already present on the surface. Often it is desirable to have an etch process that etches one material faster than another facilitating, for example, a pattern transfer process. Such an etch process is said to be selective to the first material. As a result of the diversity of materials, circuits, and processes, etch processes have been developed with a selectivity towards a variety of materials. Dry etches produced in local plasmas formed within the substrate processing region can penetrate more constrained trenches and exhibit less deformation of delicate remaining structures than wet etches.

SUMMARY

In some embodiments, a method of characterizing plasmas during semiconductor processes may include receiving operating conditions for a semiconductor process. The semiconductor process may be configured to generate a plasma inside of a chamber of a semiconductor processing system. The method may also include providing the operating conditions for the semiconductor process as inputs to a model. The model may have been trained to characterize plasmas in the chamber. The method may further include generating, using the model, a characterization of the plasma in the chamber resulting from the operating conditions of the semiconductor process.

In some embodiments, a non-transitory computer-readable medium may include instructions that, when executed by one or more processors, cause the one or more processors to perform operations including receiving operating conditions for a semiconductor process. The semiconductor process may be configured to generate a plasma inside of a chamber of a semiconductor processing system. The operations may also include providing the operating conditions for the semiconductor process as inputs to a model. The model may have been trained to characterize plasmas in the chamber. The operations may further include generating, using the model, a characterization of the plasma in the chamber resulting from the operating conditions of the semiconductor process.

In some embodiments, a system may include one or more processors and one or more memory devices that may include instructions that, when executed by the one or more processors, may cause the one or more processors to perform operations including receiving operating conditions for a semiconductor process. The semiconductor process may be configured to generate a plasma inside of a chamber of a semiconductor processing system. The operations may also include providing the operating conditions for the semiconductor process as inputs to a model. The model may have been trained to characterize plasmas in the chamber. The operations may further include generating, using the model, a characterization of the plasma in the chamber resulting from the operating conditions of the semiconductor process.

In any embodiments, any and/or all of the following features may be implemented in any combination and without limitation. The characterization of the plasma in the chamber may indicate whether the plasma is uniformly distributed in the chamber above a wafer. The operating conditions of the semiconductor process may be a part of a recipe to be executed on the semiconductor processing system. The recipe may include a pressure for the chamber and a gas characteristic. The operating conditions from the recipe may be provided to the model to test an effect of the recipe on the plasma without requiring the recipe to first be executed by the semiconductor processing system. The model may be trained to characterize the plasma at a specific pressure. The model may be trained to characterize the plasma at a specific gas characteristic. The operating conditions of the semiconductor process may include a Radio Frequency (RF) power output for an RF generator configured to provide RF power to the plasma in the chamber; and the method/operations may further include calculating an RF voltage based on the RF power output and an impedance from an impedance matching network. The model may include a K-Nearest Neighbor model. The method/operations may also include training the model using training data comprising operating characteristics from previous semiconductor processes executed on the semiconductor processing system. The training data may be labeled with characterizations of resulting plasmas as viewed through a window in an insulator of the semiconductor processing system. The training data may be labeled based on measurements from an optical emission spectrometer. The training data may be labeled by determining whether a corresponding RF voltage is in a linear region or in a flat region as a function of RF power. Determining whether a corresponding RF voltage is in a linear region or in a flat region may include providing an AC signal comprising a frequency with the RF power; and determining whether the frequency is present in the RF voltage. The operating conditions may be provided to the model from a log from a previous execution of the semiconductor process on the semiconductor processing system. The characterization of the plasma may indicate whether the plasma was a cause of a wafer failure during the previous execution of the semiconductor process on the semiconductor processing system. The operating conditions may be provided to the model from real-time sensor measurements as the semiconductor process is executed on the semiconductor processing system. The characterization of the plasma may result in a feedback signal that alters the operating conditions of the semiconductor process.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Described herein are embodiments for characterizing a plasma in a semiconductor processing system. The operating pressure inside of a chamber in a semiconductor processing system may be very high in order to facilitate the plasma reactions. Additionally, reactive gases (e.g., $NF_3$) may be included in the chamber as part of the process involving the plasma. Both the addition of the reactive gases and the high pressure inside the chamber may cause the plasma to become unstable. Instability in the plasma may cause it to rotate, shift, or skew its position or shape inside the chamber relative to the wafer being processed. As the concentration of the plasma over the wafer varies with time, this produces uneven film thicknesses on the wafer and reduces the repeatability of the process. Stabilizing the plasma requires very specific environmental conditions to be maintained inside the chamber. However, predicting the response of the plasma to a set of environment of conditions is difficult using current techniques.

In order to stabilize the plasma, the embodiments described herein provide a model that is trained to characterize a plasma in response to a set of operating conditions for a semiconductor process. The model may receive operating conditions as inputs, such as a radio-frequency (RF) voltage, an RF power setting, an impedance from an RF matching network, a chamber pressure, gas characteristics in the chamber, and/or other conditions. The model may be trained to process these operating conditions and characterize a condition of the plasma as being stable or unstable, indicating whether the plasma is uniformly distributed in the chamber above the wafer. The model may be used predictably to determine whether a proposed recipe may result in an unstable plasma. The model may also be used diagnostically to determine whether the plasma may have been responsible for a process variation or wafer failure. Some embodiments may also use the model in real time to characterize the state of the plasma during the semiconductor process.

Figure 1:
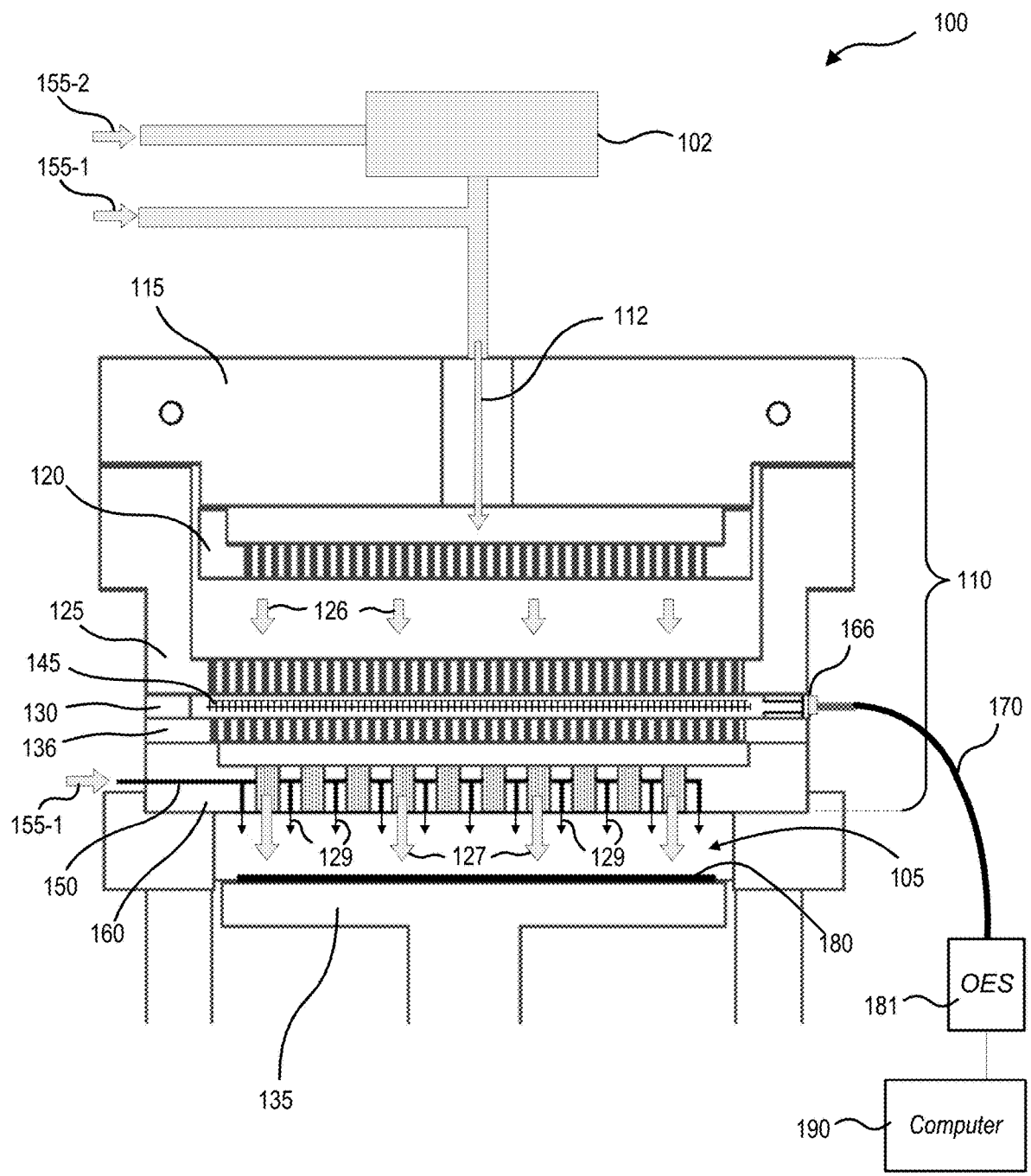
FIG. 1 schematically illustrates a simplified diagram of a semiconductor processing system, in a cross-sectional view, according to some embodiments.

FIG. 1 schematically illustrates a simplified diagram of a semiconductor processing system 100, in a cross-sectional view, according to some embodiments. The semiconductor processing system 100 may also be referred to as a plasma processing system. It should be noted that the semiconductor processing system 100 is provided only by way of example and is not meant to be limiting. The embodiments described herein may be applied to any semiconductor processing system that uses a plasma, including etch systems, deposition systems, and so forth.

The semiconductor processing system 100 may include a process chamber 105 and a plasma source 110. As shown in FIG. 1, the plasma source 110 may introduce gases 155-1 directly, and/or gases 155-2 that are optionally ionized by an upstream remote plasma source 102 as plasma source gases 112 through an RF electrode 115. In some embodiments, the upstream remote plasma source 102 need not be included, and power need not be applied to ignite a plasma in the upstream remote plasma source 102. The RF electrode 115 may include (or may be electrically tied to) a first gas diffuser 120 and a face plate 125 that may serve to redirect flow of the source gases so that gas flow is uniform across the plasma source 110, as indicated by the arrows 131. After flowing through the face plate 125, an insulator 130 may electrically insulate the RF electrode 115 from a diffuser 136 that is held at electrical ground (e.g., diffuser 136 may serve as a second electrode counterfacing the face plate 125 of the RF electrode 115). Surfaces of RF electrode 115, the diffuser 136, and/or the insulator 130 may define a plasma generation cavity where a plasma 145 may be created when the source gases are present and the RF energy is provided through the RF electrode 115. The RF electrode 115 and the diffuser 136 may be formed of any conductor, and in some embodiments may be formed of aluminum or an aluminum alloy, such as the known "6061" alloy type. The surfaces of the face plate 125 and the diffuser 136 that face the plasma cavity or are otherwise exposed to the reactive gases may be coated with yttria ($Y_2O_3$) or alumina ($Al_2O_3$) for resistance to the reactive gases and plasma products generated in the plasma cavity. The insulator 130 may be any insulator, and in some embodiments may be formed from a ceramic. Optimal emissions from the plasma 145 may enter a fiber optic 170 and may be analyzed using an optical emission spectrometer 181.

The plasma products generated in the plasma 145 may pass through the diffuser 136, which helps to promote the uniform distribution of the plasma products and may assist in electron temperature control. Upon passing through diffuser 136, the plasma products may pass through a further diffuser 160 that promotes uniformity as indicated by the small arrows 127, and may enter the process chamber 105 where they interact with a workpiece 180, such as a semiconductor wafer, atop a wafer pedestal 135. The diffuser 160 may include further gas channels 150 that may be used to introduce one or more additional gases 155-3 to the plasma products as they enter process chamber 105, as indicated by very small arrows 129.

The components of the semiconductor processing system 100 may be rearranged and may form a variety of different configurations in various embodiments. For example, the RF electrode 115 and the diffuser 136 may be substantially radially symmetric in the configuration shown in FIG. 1, and the insulator 130 may include a ring with upper and lower planar surfaces that may be disposed against peripheral areas of the face plate 125 and the diffuser 136. This configuration may be adapted to process a circular semiconductor wafer as the workpiece 180. However, this configuration is provided only by way of example and is not meant to be limiting. Such features may be of any shape that is consistent for use as a plasma source. Moreover, the exact number and placement of features for introducing and distributing gases and/or plasma products, such as the diffusers, the face plates and/or the like, may also vary in number and configuration. Also, just as the diffuser 160 may include gas channels 150 to add gas 155-3 to the plasma products from the plasma 145 as the enter the chamber 105, other components of the semiconductor processing system 100 may be configured to add or mix gases 155 with other gases and/or plasma products as they make their way through the system to process chamber 105.

When plasma source gases are introduced and electrical power is provided across face plate 125 and diffuser 136, a plasma 145 may form therein. The insulator 130 may form a radial aperture, and an optical window 166 may seal to the insulator 130 over the aperture. The optical window 166 may be formed from sapphire, however it is appreciated that other materials be also be used for the optical window 166 that may be selected based on resistance to plasma source gases and/or plasma products of the plasma 145 and/or transmissivity to optical emissions.

Fiber optic 170 is positioned such that when plasma 145 exists in the plasma generation cavity, optical emissions that originate in the plasma 145 may propagate through a radial aperture and the optical window 166 into the fiber optic 170 to generate an optical signal therein. The fiber optic 170 may transmit optical emissions to the optical emission spectrometer 181. In some embodiments, the fiber optic 170 may include a 400 µm core optical fiber; however, other core sizes and various fiber materials may be selected for transmissivity of the optical emissions and to manage the signal strength within the fiber optic 170. For example, plasmas that generate low levels of optical emissions may be monitored utilizing a relatively a wide core (e.g., 400 µm) fiber optic 170, while plasmas that generate higher levels of optical emissions may be monitored utilizing relatively narrower cores (e.g., 110 µm, 100 µm, 62.5 µm, 50 µm, 9 µm or other core sizes) in order to limit the optical signal reaching the optical emission spectrometer 181. One or more filters may be utilized at the optical emission spectrometer 181 to absorb stray light and/or emissions that are not within a spectral band of interest.

The optical emission spectrometer 181 may analyze the optical signal received from the fiber optic 170 to identify emission peaks within the signal, including identifying specific emission peaks as corresponding to energy transitions of specific elements. In some embodiments, spectra and/or information characterizing emission peaks therein may be viewed and/or manipulated on the optical emission spectrometer 181. In some embodiments, emission peak information may be transferred to a computer 190 for analysis, manipulation, storage and/or display. The computer 190 may include a processor, and the computer 190 may send and receive signals from other parts of the semiconductor processing system 100.

Accurately identifying when plasma equipment is running a stable process is valuable in the semiconductor industry. Semiconductor processing is characterized both by unusable equipment having high cost and workpieces having high value that is at risk if processing is not optimal. For example, a single semiconductor processing system may represent hundreds of thousands, or a few million dollars of capital investment, with output of a multimillion dollar wafer fabrication area being dependent on only a few of such systems. Yet, a single semiconductor wafer may accrue thousands of dollars of invested processing costs, and a piece of plasma equipment may process tens of such wafers per hour. Thus the costs of equipment downtime, or of utilizing equipment that is not operating correctly, are both quite high. The embodiments described herein improve the functioning of the semiconductor processing systems by accurately characterizing stable plasmas and identifying operating conditions that generate stable plasmas.

Figure 2:
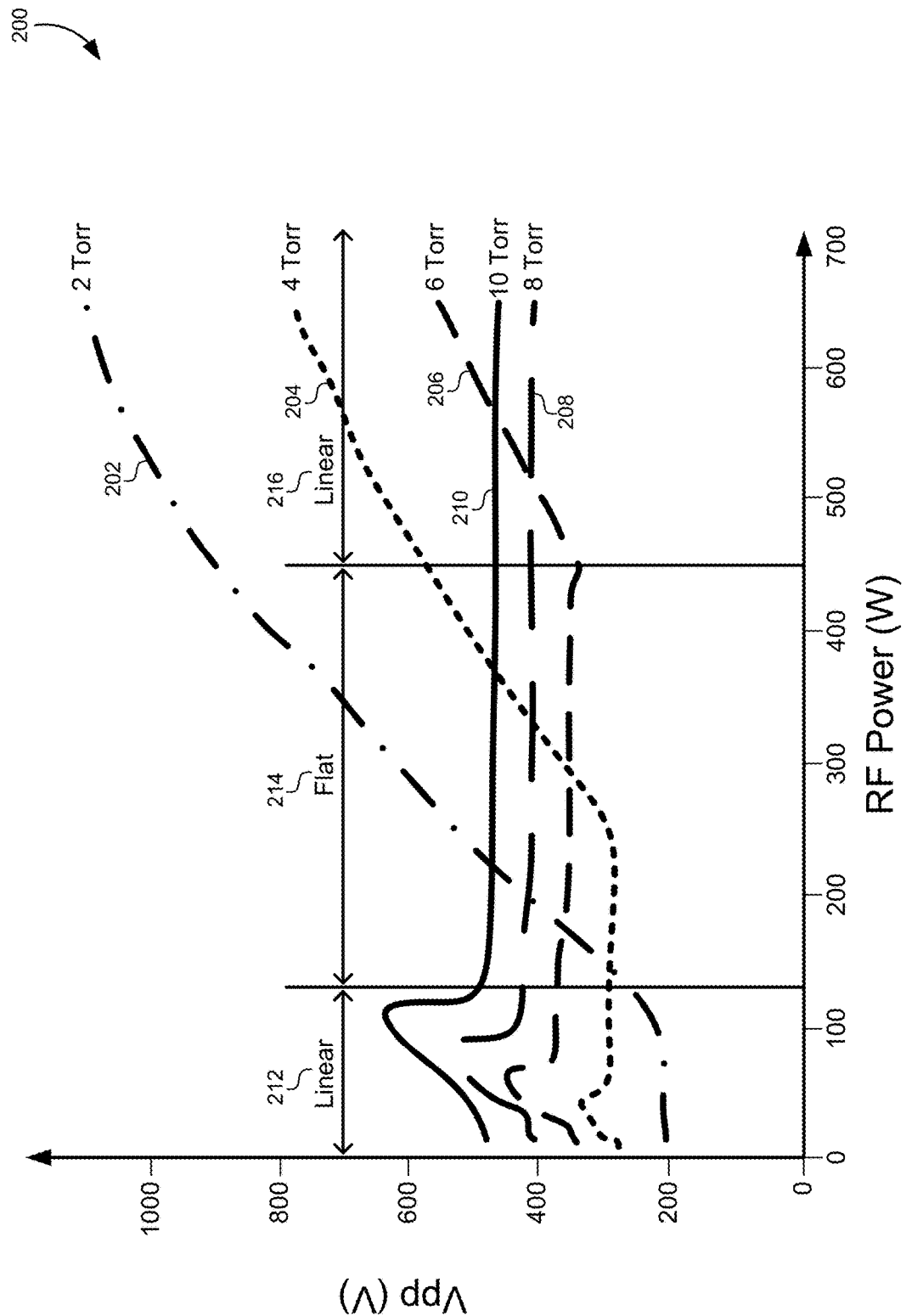
FIG. 2 illustrates a graph of RF voltages resulting from applied RF power to a plasma, according to some embodiments.

FIG. 2 illustrates a graph of RF voltages resulting from an applied RF power to a plasma, according to some embodiments. As described above, an RF generator may apply RF power to a plasma inside a chamber of a semiconductor processing system. The RF power may be used to generate and control the plasma such that the desired process (e.g., deposition, etching) may be carried out by the plasma on the wafer. The applied RF power may be part of what is referred to herein as a "recipe" for operating the semiconductor processing system. A recipe may include a set of input operating conditions that may be applied to the semiconductor processing system to perform a specific process. For example, a recipe may include operating conditions such as an amount of RF power, an impedance from an impedance matching network, an operating temperature, an operating pressure inside of the chamber of the semiconductor processing system, gas characteristics, such as flowrates, concentrations, gas species, and so forth.

The impedance matching network for the RF generator may vary in order to match the impedance of the plasma. Matching the impedance of the plasma prevents reflections of the RF power back into the RF generator. Because the impedance of the plasma changes with time and other conditions in the chamber, the impedance of the matching network may also change over time and as the input RF power changes. Therefore, the RF voltage (such as an RMS voltage or a peak-to-peak voltage, Vpp) of the RF generator may vary over time as a function of the corresponding impedance of the impedance matching network and the RF power setting of the RF generator, among other variables.

FIG. 2 illustrates how the RF voltage (Vpp) on the vertical axis varies as a function of the RF power output of the RF generator on the horizontal axis. The impedance of the plasma may change when different chamber pressures are applied. Consequently, the voltage curves may also change at different chamber pressures. FIG. 2 illustrates a voltage curve 202 for a chamber pressure of 2 Torr, a voltage curve 204 for a chamber pressure of 4 Torr, a voltage curve 206 for a chamber pressure of 6 Torr, a voltage curve 208 for a chamber pressure of 8 Torr, and a voltage curve 210 for a chamber pressure of 10 Torr.

Generally, the response of the RF voltage as a function of applied RF power may be subdivided into a number of different regions as illustrated in FIG. 2. These regions may be characterized by how the RF voltage responds to the RF power. For example, the RF voltage may respond in a linear fashion in response to increasing/decreasing the RF power. In other regions, the RF voltage may be characterized as being "flat" where the response is approximately constant with increases/decreases to the RF power. Depending on other operating conditions, such as the chamber pressure, the number of different linear and/or flat regions in a particular voltage curve may vary. For example, voltage curve 210 at 10 Torr may include a linear region followed by flat region. In contrast, voltage curve 202 may include a flat region followed by a linear region. The example of FIG. 2 characterizes these regions for voltage curve 206 at 6 Torr. Voltage curve 206 this includes a linear region 212, followed by flat region 214, followed by another linear region 216.

The embodiments described herein leverage a discovered correlation between the type of voltage curve and the corresponding state of the resulting plasma in the chamber. For example, plasmas tend to be evenly distributed uniformly above the surface area of the wafer in the linear regions 212, 216. In contrast, plasmas tend to be unevenly distributed, skewed, or have unequal concentrations above the surface area of the wafer in the flat region 214. Therefore, these embodiments may train a model to accept the RF voltage (along with other possible operating conditions) as an input and generate an output that characterizes the state of the plasma in the chamber.

Figure 3:
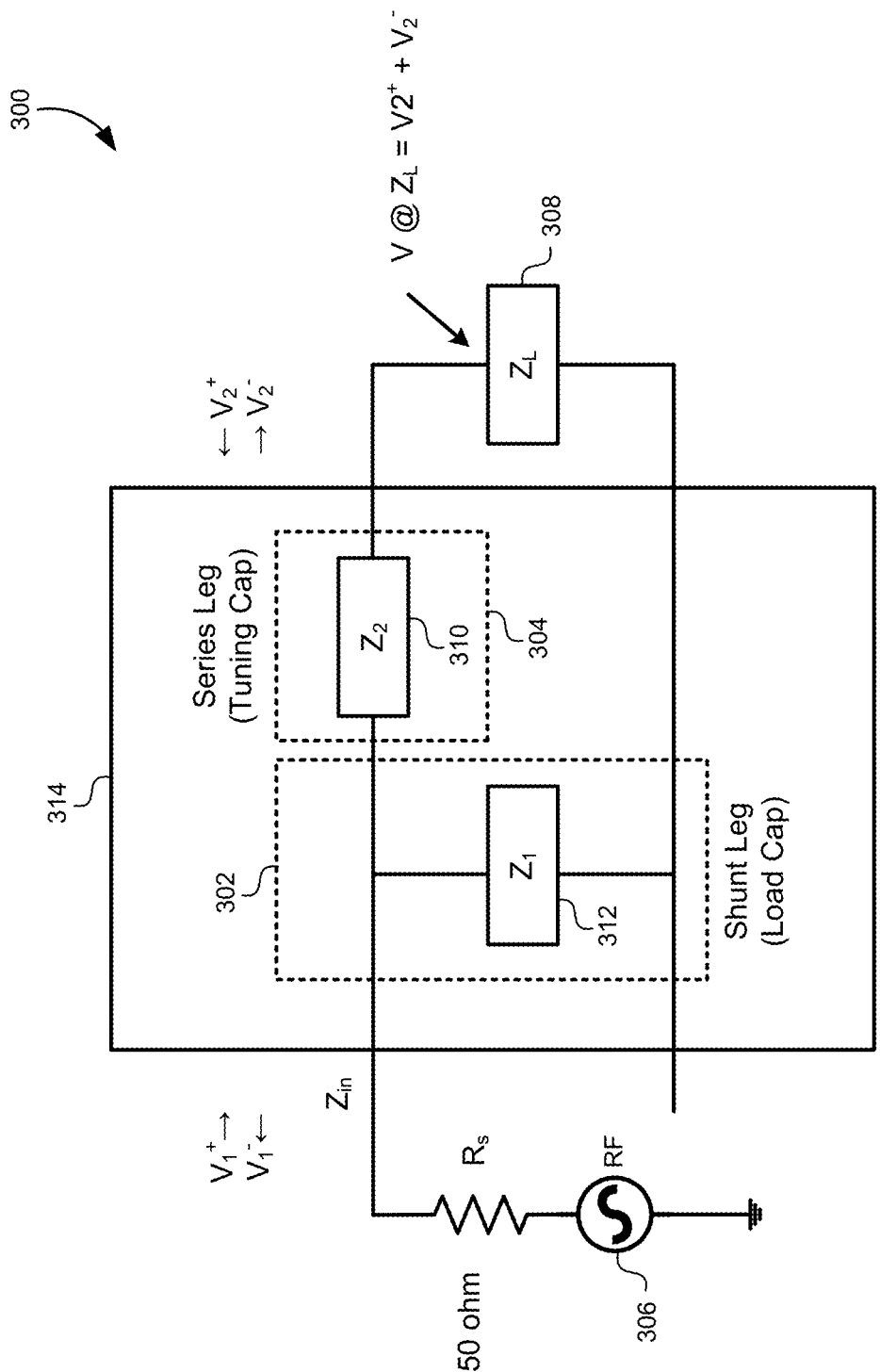
FIG. 3 illustrates a circuit diagram of an impedance matching network for an RF generator in a semiconductor processing system, according to some embodiments.

FIG. 3 illustrates a circuit diagram of an impedance matching network for an RF generator in a semiconductor processing system, according to some embodiments. The RF generator 306 may include an output impedance (e.g., 50 ohms), and may provide an RF signal to a plasma in the chamber of the semiconductor processing system. The impedance of the plasma may be represented as a load impedance 308. As described above, the load impedance 308 representing the plasma may change throughout the course of the semiconductor process. In order to prevent reflections of RF power back into the RF generator 306, an impedance matching network 314 may dynamically adjust the load impedance 308. For example, the impedance matching network 314 may include a shunt leg 302 with a shunt impedance 312 and a series leg 304 with a series impedance 310. The shunt impedance 312 and/or the series impedance 310 may be implemented using tuning capacitors, and the values of these capacitors may be set during the semiconductor process such that the total output impedance of this combined circuit matches the load impedance 308 as the plasma changes.

Generally, the impedance matching network 314 may provide an output of the current impedance generated by the combined shunt leg 312 and series leg 304. Additionally, some embodiments of the impedance matching network 314 may provide an output that indicates the RF output voltage. In order to maintain a constant RF power, the RF voltage may change as the impedance of the impedance matching network 314 changes. Therefore, some embodiments may simply use the voltage output from the impedance matching network 314 as an input to the models described below.

Instead of reading and RF voltage output from the impedance matching network 314, some embodiments may calculate a real-time RF voltage based on an RF input power and the real-time impedance generated by the impedance matching network 314. The RF voltage may be calculated from the RF power and the impedance of the impedance matching network 314 using standard complex power equations and techniques.

Figure 4:
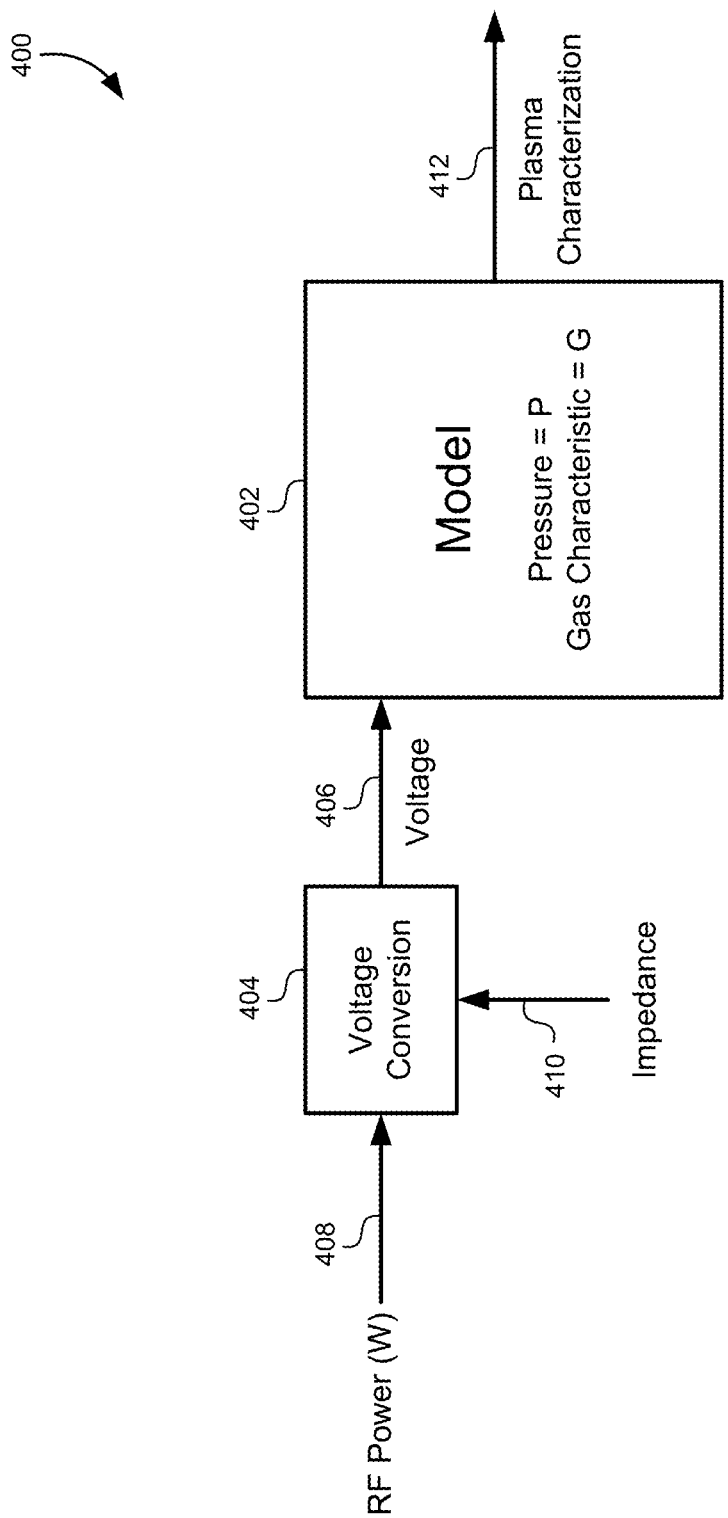
FIG. 4 illustrates a simplified block diagram of a model-based system for characterizing a plasma in a semiconductor processing chamber, according to some embodiments.

FIG. 4 illustrates a simplified block diagram 400 of a model-based system for characterizing a plasma in a semiconductor processing chamber, according to some embodiments. A model 402 may be implemented using any number of different classification models. In machine learning, a classification model may be trained to receive inputs from an environment and generate a classification that characterizes that environment. This model 402 may generate a plasma characterization 412 that classifies the plasma. Some embodiments may use a binary classification that characterizes the plasma as "good" or "bad." For example, the model 402 may be trained to characterize plasmas as "good" that have a threshold level of uniformity or that uniformly cover the area above the wafer. Other embodiments may use multi-class classifications that, for example, characterize the plasma on a numeric or enumerated scale (e.g., between 1.0 and 10.0).

Various model types may be used to implement the model 402. For example, K-Nearest Neighbor (KNN) models, logistic regression models, neural network models, Naïve Bayes models, decision tree models, Support Vector Machine (symPoly) models, gradient boosting models, random forest models, and other model types may be used. In one particular embodiment, a KNN model has been trained to be more than 99% accurate in characterizing a plasma in a chamber.

In this configuration, the RF power 408 may be received as an input from the RF generator. Similarly, the impedance 410 generated by the impedance matching network may be received as an input from the impedance matching network. A voltage conversion process 404 may calculate the RF voltage based on the impedance 410, the RF power 408, and any other known parameters of the RF generator (such as the output impedance). The voltage conversion process 404 may provide the RF voltage 406 as an input to the model 402.

In this configuration, the model 402 may be trained for a specific pressure (P) and a specific gas characteristic (G). For example, a recipe may call for the chamber pressure to be approximately 2.0 Torr. The gas characteristic may refer to any characteristic of one or more gases in the chamber. This may include types of gas species, gas concentrations, gas flow rates, and/or any other characteristic of the gaseous environment inside the chamber. For example, a recipe may call for a gas flow rate of 100 SCCM of $NF_3$. Therefore, the model 402 may be trained for this specific type of recipe using these gas characteristics and/or pressures inside the chamber.

Figure 5:
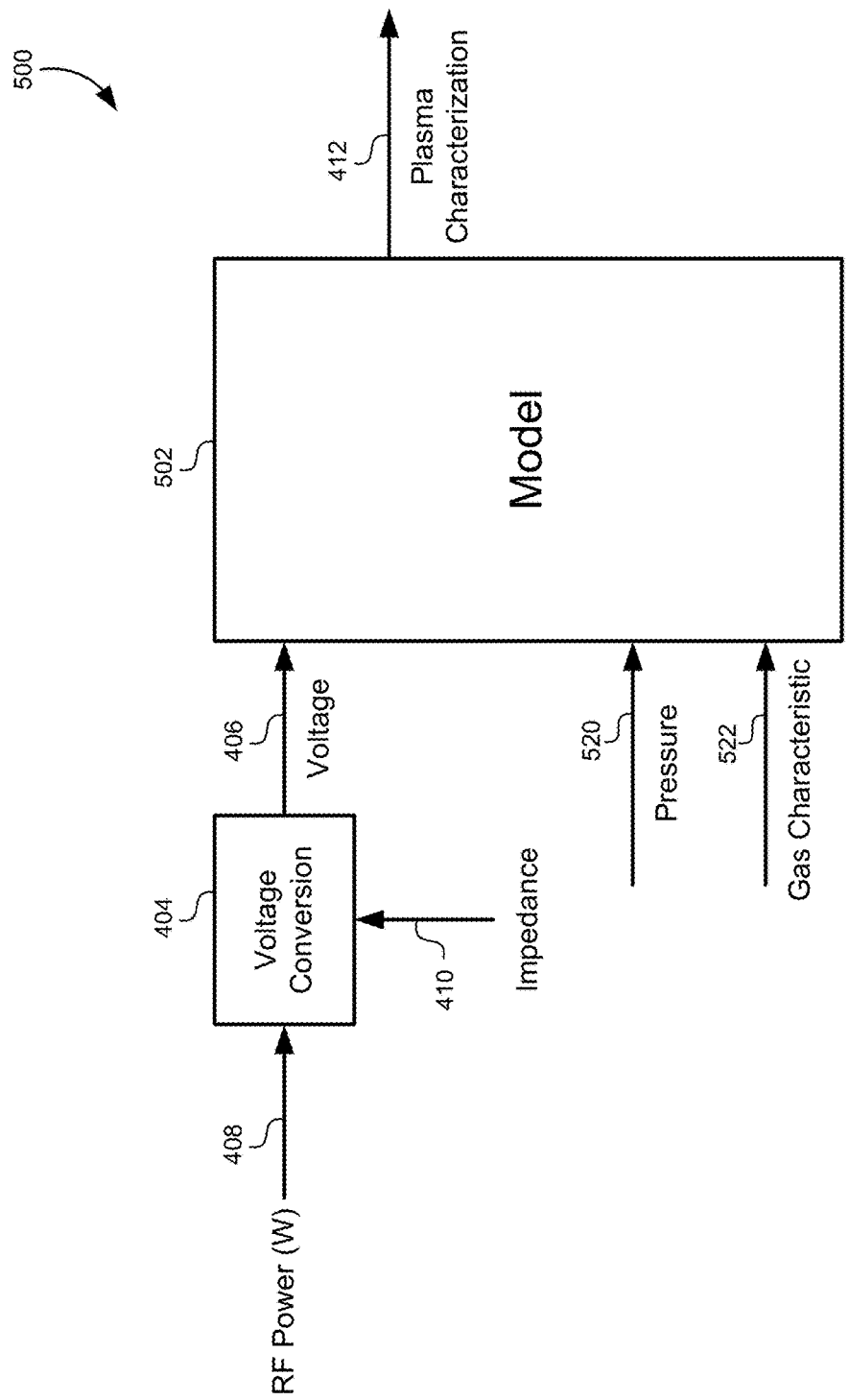
FIG. 5 illustrates a block diagram of a model that is compatible with different pressure/gas combinations, according to some embodiments.

FIG. 5 illustrates a block diagram 500 of a model 502 that is compatible with different pressure/gas combinations, according to some embodiments. The model 502 is similar to the model 504 in FIG. 4, the difference being that the a pressure 520 of the chamber and/or one or more gas characteristics 520 for the chamber may be provided as inputs to the model 502 along with the RF voltage 406. As illustrated above in FIG. 2, the pressure and/or gas characteristics may affect the voltage curve and the prediction of the plasma characterization. Therefore, the model 502 may be provided the pressure 520 and/or gas characteristics 522 as an input. For example, the pressure 520 and/or the gas characteristics 522 may be received from a recipe file for a semiconductor process. Alternatively, these inputs may be provided from real-time sensors or settings of a live semiconductor process. Some embodiments may also provide these inputs from a log file from a previous semiconductor process.

Although FIG. 5 illustrates both the pressure 520 and the gas characteristics 522 being provided as inputs, other embodiments may use combinations of the operating conditions in different ways. For example, some embodiments may provide pressure 520 as an input, while training the model 502 for a specific gas characteristic, which would remove the need for the input of the gas characteristic 522. Instead, the gas characteristic 522 would be used to select the model 502 from a plurality of models trained at different gas characteristics. Conversely, the model 502 may receive the gas characteristic 522 as an input, while being trained at a specific pressure rather than receiving the pressure 520 as an input. A pressure from a recipe may instead be used to select the model 522 from among a plurality of models, each of which may be trained for different chamber pressures. Additionally, other operating conditions may be provided as inputs or may result in models specifically trained for those operating conditions. Other operating conditions may include temperature, chucking voltage, wafer size, time under process, and/or any other characteristic of the semiconductor process.

Figure 6:
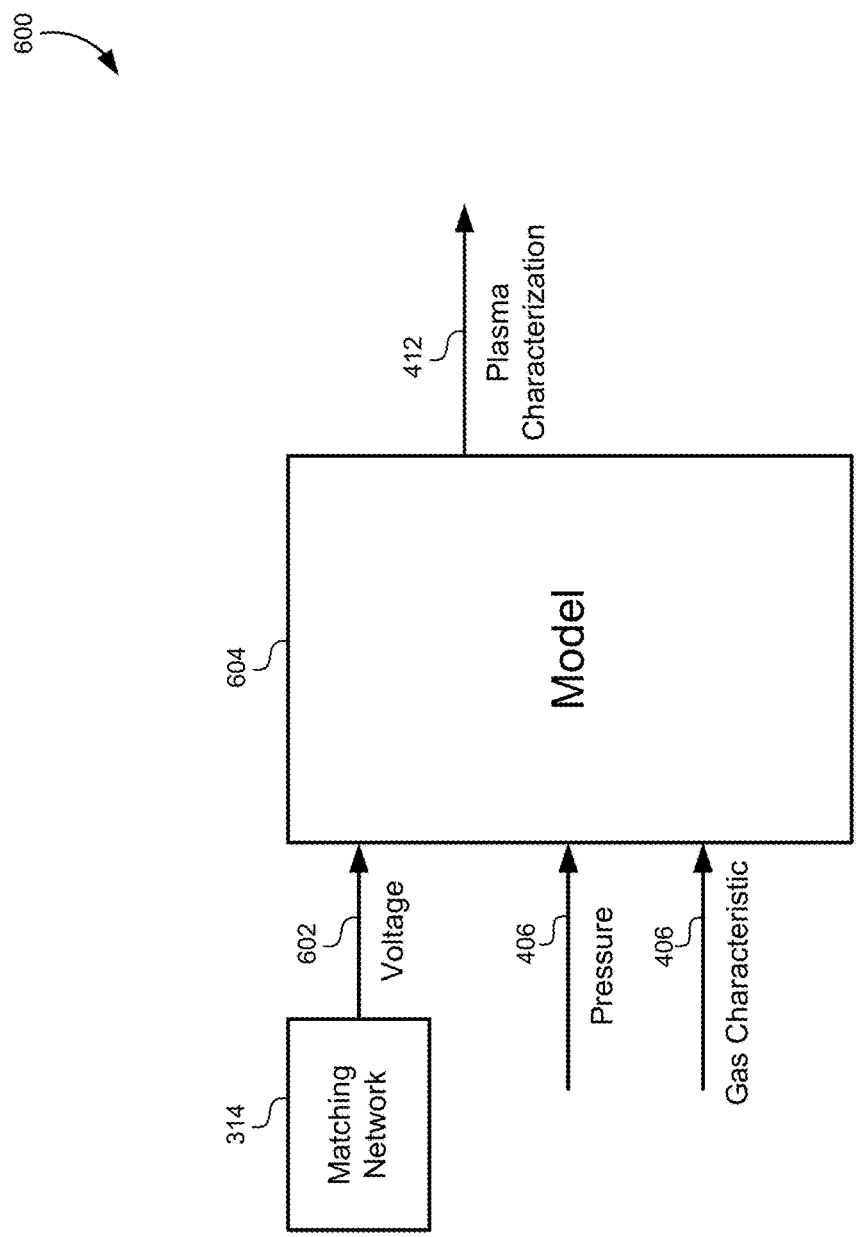
FIG. 6 illustrates a block diagram of a model that receives a voltage measurement directly from an impedance matching network, according to some embodiments.

FIG. 6 illustrates a block diagram 600 of a model 602 that receives a voltage measurement directly from an impedance matching network 314, according to some embodiments. This block diagram 600 is similar to the block diagram 500 illustrated above in FIG. 5. However, instead of including a specific voltage conversion process 404, the model 604 may receive an RF voltage measurement 602 directly from the impedance matching network. As described above, some impedance matching networks may provide an output that indicates the real-time voltage applied as a result of the output impedance generated by the impedance matching network 314. Thus, the model 604 may accept the RF voltage 604 as an input from any source.

Although not shown explicitly in FIG. 6, the model 604 may also be trained to receive the RF power and the impedance from the impedance matching network 314 instead of receiving the RF voltage 602 as an input. For example, the RF generator or a recipe under test may provide an RF voltage as an input, and the output impedance for the matching network may provide an impedance value. The model 604 may be trained using the process described below to internally represent the calculations that would be performed to determine an RF voltage.

Figure 7:
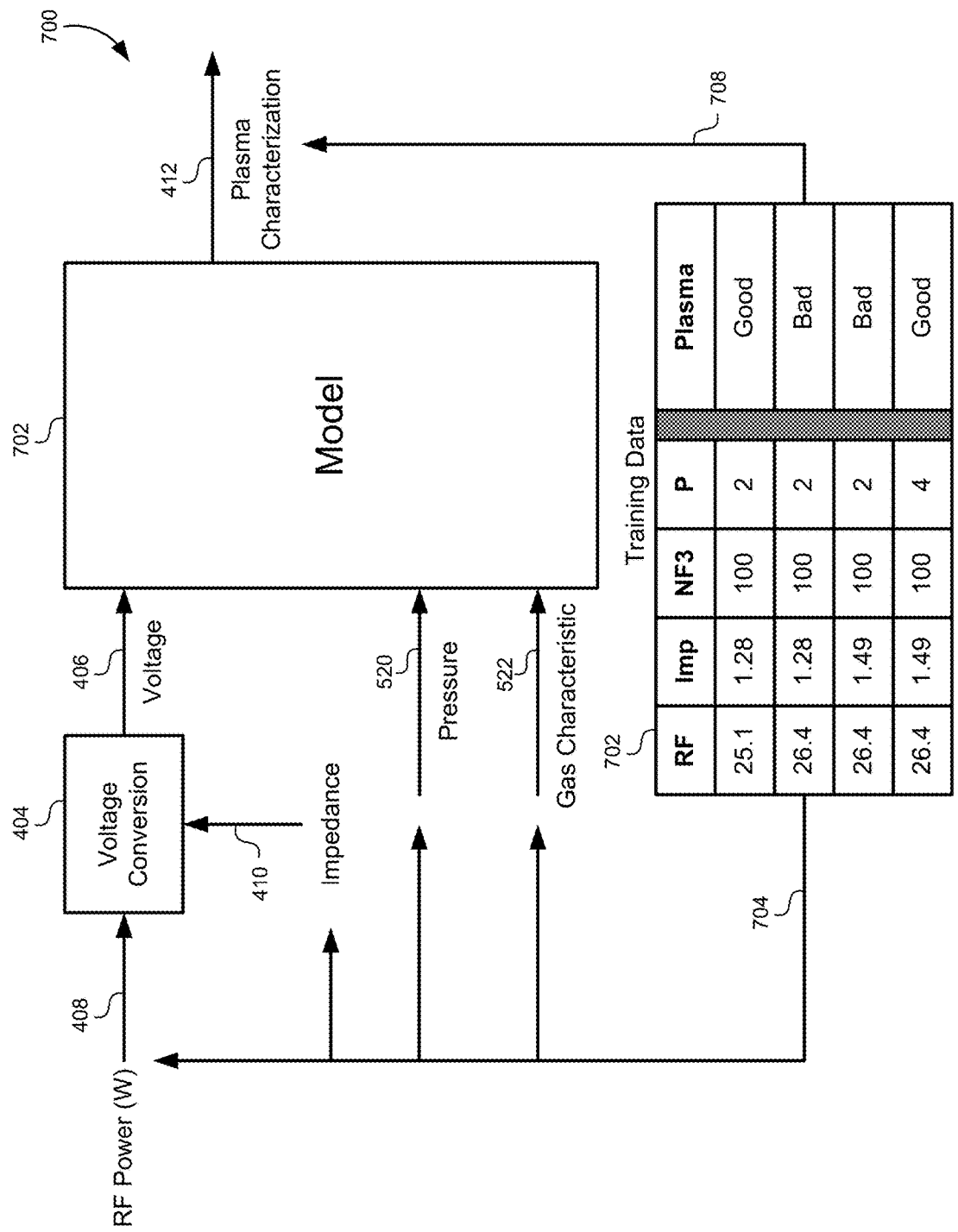
FIG. 7 illustrates a block diagram of a method for training a model, according to some embodiments.

FIG. 7 illustrates a block diagram 700 of a method for training a model 702, according to some embodiments. The model 702 may use any of the inputs or configurations described in the preceding figures. In order to train the model, training data 702 may be provided from a number of different sources. In some embodiments, the training data 702 may represent a recipe that has been run on a semiconductor processing system. The recipe may include settings for RF power, impedance values, gas characteristics, chamber pressures, and so forth. Each different recipe may be provided as one set of training data to the model 702. Alternatively, the training data 702 may be received from real-time sensor measurements or settings from a live chamber test. As these settings or measurements are set/received by the semiconductor processing system, they may also be provided to the model 702 in a training session. In some embodiments, the training data 702 may also be taken from a log of measurements, recipes, and/or settings from a previous semiconductor process.

The training data 702 may be labeled by examining the state of the resulting plasma. In some embodiments, the state of the plasma may be visually observed directly. For example, as described above in FIG. 1, one or more transparent windows may be provided in the insulator that grants visual access to the plasma. An operator or the OES 181 may visually inspect the state of the plasma as different operating conditions are applied to the semiconductor processing system. For example, an operator may visually classify the plasma as "good" or "bad" depending on its position in the chamber.

Some embodiments may label training data 702 by characterizing the plasma using automated methods. For example, the OES 181 may receive light emissions generated by the plasma in the chamber. Uniform light emissions may indicate a uniform plasma state, whereas variations in the light emissions may indicate a more unstable or variable plasma state. Alternatively, a light-intensity sensor may be used to record the intensity of the light received from the plasma in the chamber. If the plasma is unstable and begins to rotate or move, the intensity of the light will vary or "flicker" over time. The light-intensity sensor and/or the OES 181 may be compared to thresholds or acceptable operating ranges in order to label the training data 702.

In some embodiments, the training data 702 may be labeled without necessarily observing a physical plasma in the chamber. Instead, the relationship between the linear and/or flat regions of the voltage curve and the plasma state described above in FIG. 2 may be used to automatically label the training data 702. For example, if the operating conditions 704 from the recipe generate a voltage that is in a linear region, the plasma characterization may be assumed to be good. If the operating conditions 704 from the recipe generate a voltage that is in a flat region, the plasma characterization may be assumed to be bad. When an RF power input does not change in the recipe, the resulting region of the voltage curve may be identified by applying a small sinusoidal AC signal on the RF power input 408. If the resulting voltage 406 also varies at a similar frequency, then the voltage curve may be assumed to be in a linear region, and the training data may be labeled as "good." Conversely, if the resulting voltage 406 does not show any variation at a similar frequency, then the voltage curve may be assumed to be in a flat region, and the training data may be labeled as "bad."

Figure 8:
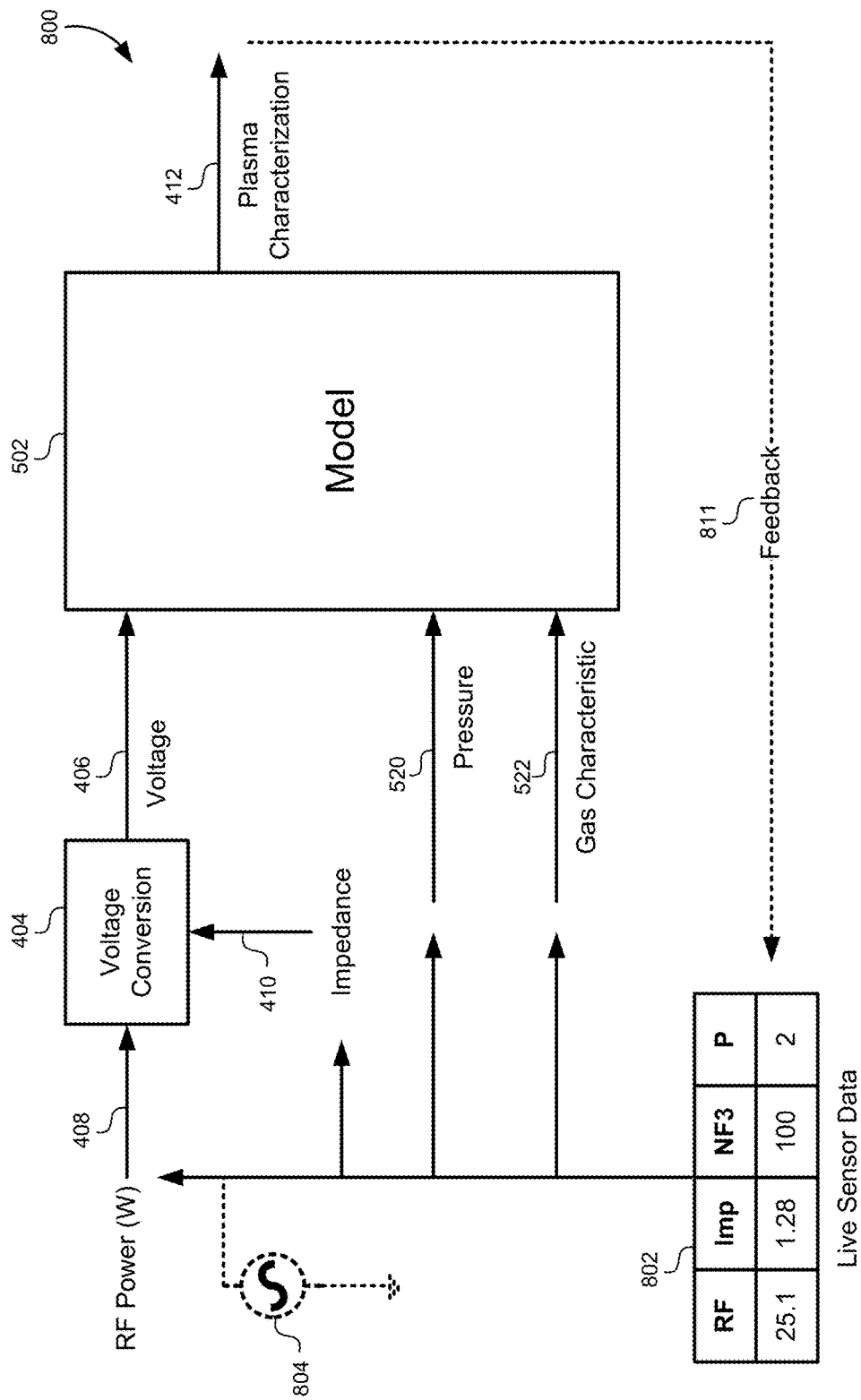
FIG. 8 illustrates a block diagram of a system for monitoring a real-time performance of a semiconductor processing system, according to some embodiments.

FIG. 8 illustrates a block diagram 800 of a system for monitoring a real-time performance of a semiconductor processing system, according to some embodiments. The model 502 may be provided inputs from live sensor data 802 from a semiconductor processing system. For example, an RF generator 804 may provide an output that is provided directly as the RF power input 408 for the model 502. Similarly, a pressure sensor in the semiconductor processing system may provide the pressure to the model 502 as an input. In response, the model 502 may generate a plasma characterization 412 for the real-time state of the plasma.

Some embodiments may provide feedback 811 to the operation of the semiconductor processing system. For example, if the recipe calls for a change in RF power, the plasma characterization 512 may provide a feedback indicating that the recipe change has caused the plasma to become unstable or non-uniform. This may cause a controller for the semiconductor process to revert back to a previous setting in the recipe.

Alternatively or additionally, instead of providing feedback 811, a log of the plasma characterization 412 may be examined after the semiconductor process is complete in order to determine a cause of a wafer failure or other anomalous result. For example, the log file may indicate that a particular change in the input recipe corresponded with a change in the characterization of the plasma. In some embodiments, the log of the plasma characterization 412 may indicate that the plasma likely was or was not responsible for the wafer failure. Many different systems interact in a complex environment in the semiconductor processing system, and this model 502 may be used to rule in or out the plasma as a cause of a wafer failure, allowing troubleshooting techniques to be focused on other portions of the semiconductor processing system.

Figure 9:
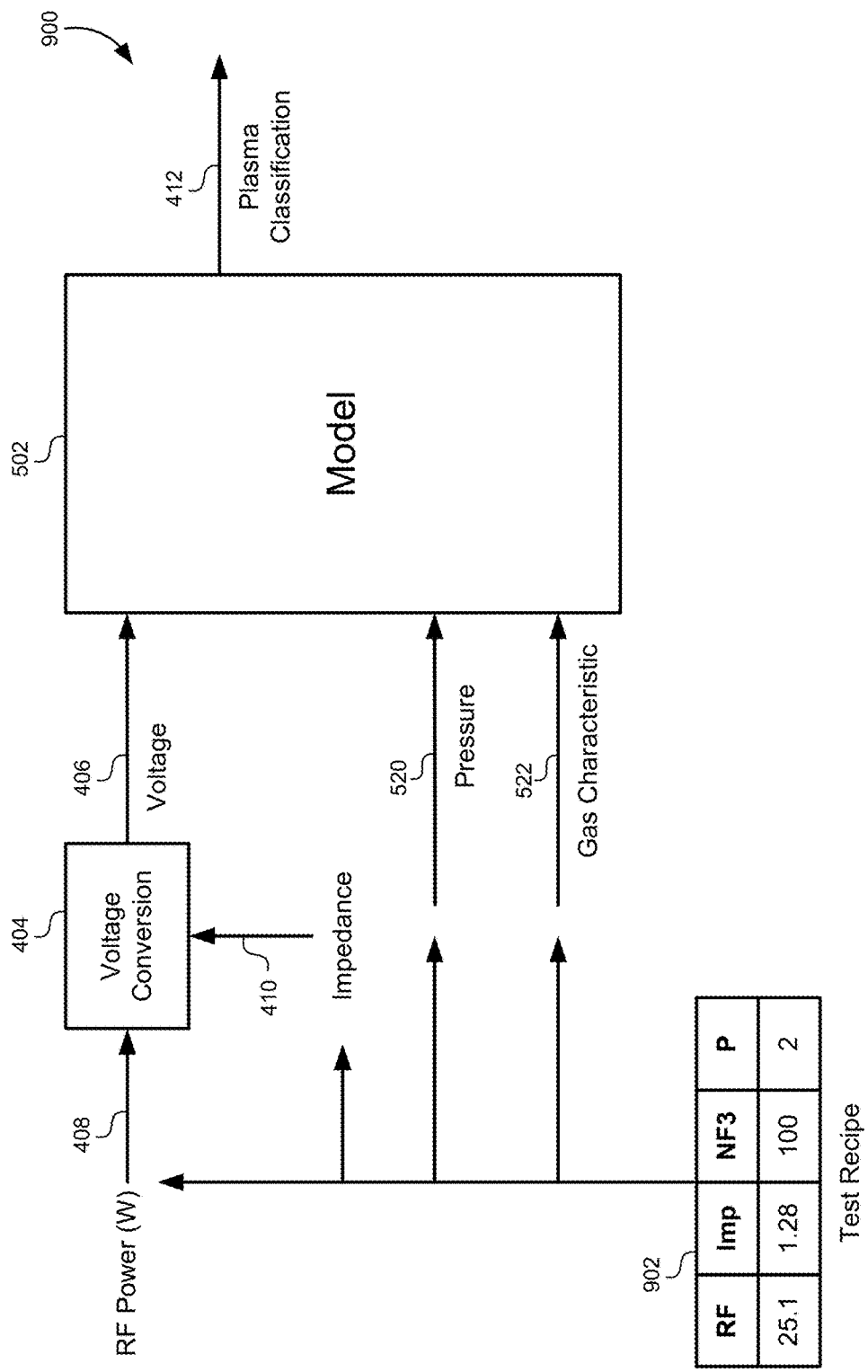
FIG. 9 illustrates a block diagram of a system for testing new recipes before being executed on a processing system, according to some embodiments.

FIG. 9 illustrates a block diagram 900 of a system for testing new recipes before being executed on a processing system, according to some embodiments. In addition to using the model 502 as a real-time monitoring tool and/or a post-process diagnosis tool, the model 502 may also be used predictably before a recipe is executed by a semiconductor processing system. For example, a test recipe 902 may be provided to the model 502. The operating conditions may be provided as inputs to the model 502, which may generate a plasma characterization 412 for those operating conditions. If any of the plasma characterizations indicate that the recipe may cause the plasma to become unstable or non-uniform, the recipe may be refined or altered until it maintains a uniform plasma in the chamber. This allows the test recipe 902 to be tested to determine whether generate an unstable or non-uniform plasma before it is executed on an actual wafer.

Figure 10:
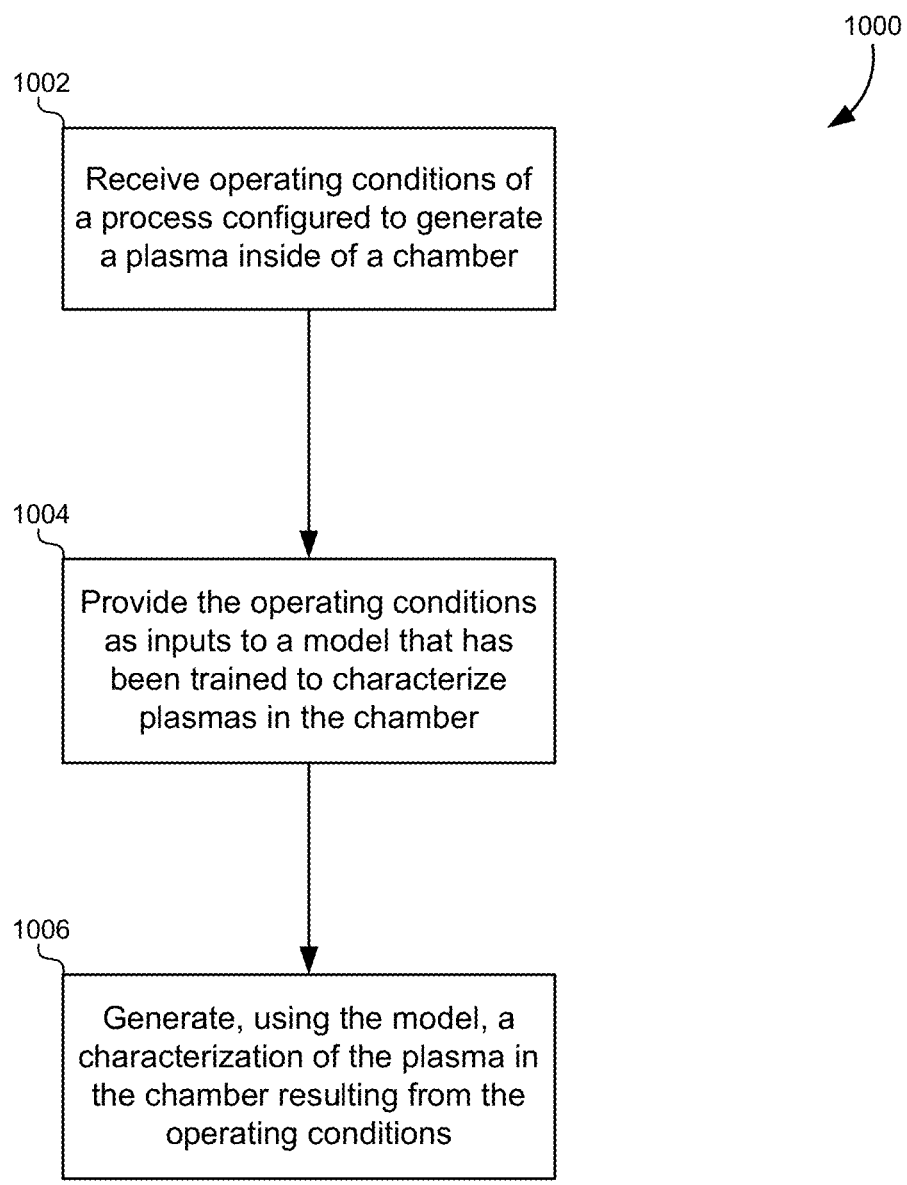
FIG. 10 illustrates a flowchart of a method for characterizing plasmas during semiconductor processes, according to some embodiments.

FIG. 10 illustrates a flowchart 1000 of a method for characterizing plasmas during semiconductor processes, according to some embodiments. The method may be executed by a computing system, such as a control system for the semiconductor processing system described above in FIG. 1. Alternatively, the data may be analyzed and/or characterized on any computing system separately from the semiconductor processing system. For example, the computing system illustrated below in FIG. 11 may be used to implemented any of the embodiments discussed herein.

The method may include receiving operating conditions of a semiconductor process (1002). The semiconductor process may be configured to generate a plasma inside of a chamber of a semiconductor processing system. The operating conditions may include any of the conditions described above, such as pressure, temperature, gas characteristics, RF power, RF voltage, impedance, and so forth. The operating conditions may be provided from a recipe before the recipe is executed by the semiconductor processing system. The operating conditions may also be provided from a recipe during or after execution by the semiconductor processing system. In some embodiments, the operating conditions may be provided from live sensors or settings that are recorded or received from a semiconductor processing system. The semiconductor processing system may generate a plasma that is maintained near a wafer to perform a semiconductor process, such as etching, deposition, and/or the like.

The method may further include providing the operating conditions of the semiconductor process as inputs to a model (1004). The model may be trained to characterize plasmas in the chamber. As described above in FIGS. 3-9, the model may accept some of the operating conditions as inputs, while training specific models to represent other operating conditions. For example, the model may be trained to characterize a plasma at a specific pressure rather than receiving that pressure as an input. The model may also be trained to characterize a plasma with specific gas characteristics rather than receiving the gas characteristics as an input.

The model may be trained using recipes that were previously executed by the semiconductor processing system. The training data may be labeled using characterizations of the resulting plasma in the plasma chamber. For example, a plasma may be visually characterized by virtue of transparent windows or material in an insulator of the chamber. The plasma may also be automatically characterized using optical measurements that detect rotation or variations in the plasma relative to the position of the wafer. In some cases, the correlation between the shape of the voltage curve and the resulting plasma state may be used to automatically label the plasma without requiring execution of the recipe on a semiconductor processing system.

The method may also include generating, using the model, a characterization of the plasma in the chamber resulting from the operating conditions of the semiconductor process (1006). The characterization of the plasma may be a binary characterization indicating whether the plasma is uniformly distributed over the wafer (e.g., good or bad). Other characterizations may include multiple states, such as providing a score in a numerical range. The characterization of the plasma may be predictive, such that it is generated before the plasma actually exists in the chamber using operating conditions from a recipe. The characterization of the plasma may also be generated after the semiconductor process has completed, and thus may use log data or other operating conditions from a previous process to diagnose whether a wafer failure was caused by the plasma. The characterization of the plasma may also be generated in real time as the semiconductor process is executed. This may be used to generate warnings or alerts when the plasma enters an unstable state. This also be used to generate a feedback signal that adjusts the operating conditions accordingly to maintain a stable state in the plasma.

It should be appreciated that the specific steps illustrated in FIG. 10 provide particular methods of characterizing plasmas during semiconductor processes according to various embodiments. Other sequences of steps may also be performed according to alternative embodiments. For example, alternative embodiments may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. Many variations, modifications, and alternatives also fall within the scope of this disclosure.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 11:
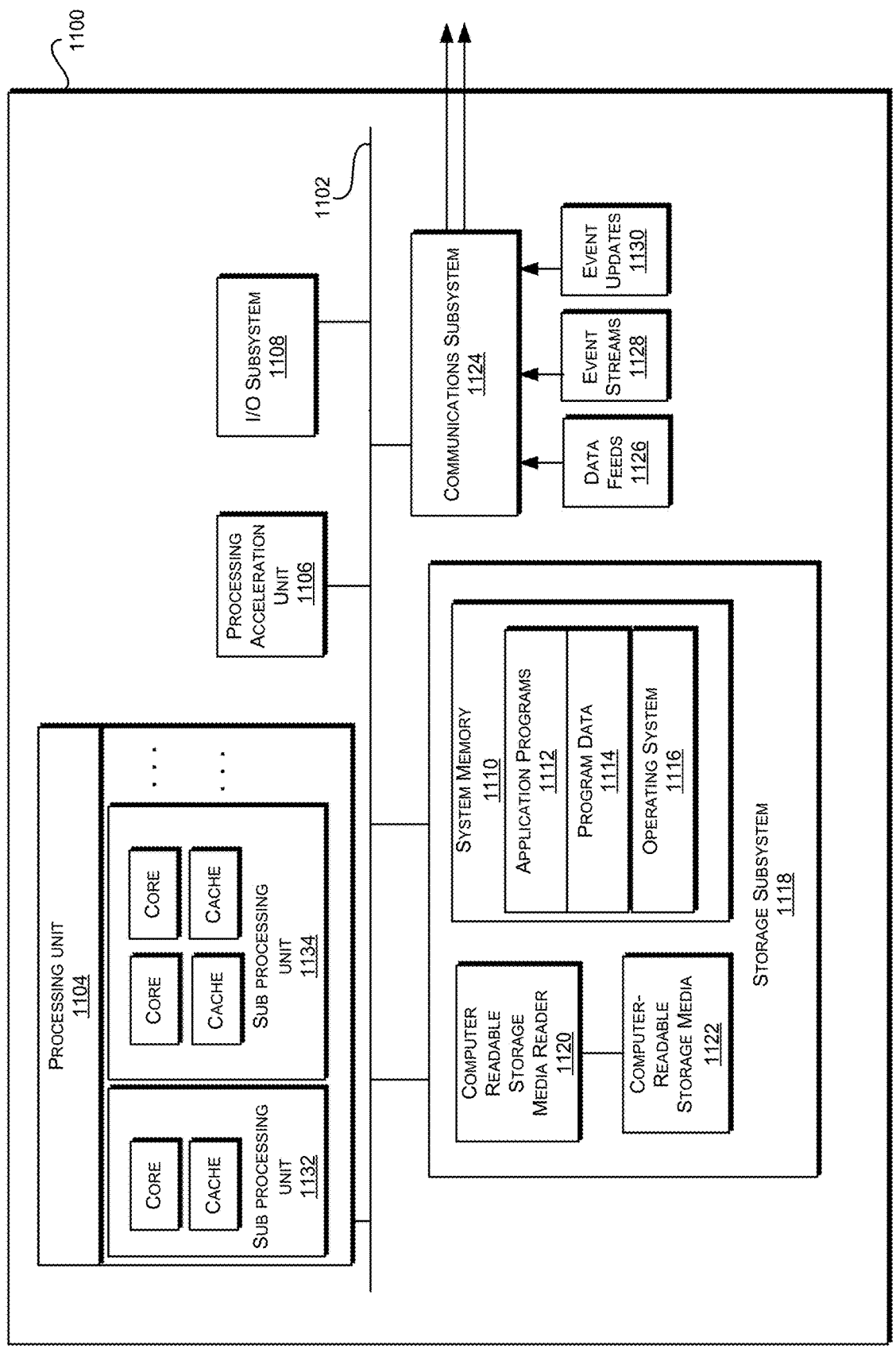
FIG. 11 illustrates an exemplary computer system, in which various embodiments may be implemented.

FIG. 11 illustrates an exemplary computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with some embodiments.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination.

Further, connection to other computing devices, such as network input/output devices, may be employed. Based on the disclosure and teachings provided herein, other ways and/or methods to implement the various embodiments should be apparent.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments.

However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have beeen described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, features are described with reference to specific embodiments thereof, but it should be recognized that not all embodiments are limited thereto. Various features and aspects of some embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of characterizing plasmas during semiconductor processes, the method comprising:
    receiving operating conditions for a semiconductor process, wherein the semiconductor process is configured to generate a plasma inside of a chamber of a semiconductor processing system;
    providing the operating conditions for the semiconductor process as inputs to a model, wherein the model has been trained to characterize plasmas in the chamber using training data comprising operating characteristics from previous semiconductor processes executed on the semiconductor processing system, wherein the training data is labeled by determining whether a corresponding Radio Frequency (RF) voltage is in a linear region or in a flat region as a function of RF power; and
    generating, using the model, a characterization of the plasma in the chamber resulting from the operating conditions of the semiconductor process, wherein the characterization of the plasma results in a feedback signal that alters the operating conditions of the semiconductor process.

2. The method of claim 1, wherein the characterization of the plasma in the chamber indicates whether the plasma is uniformly distributed in the chamber above a wafer.

3. The method of claim 1, wherein the operating conditions of the semiconductor process are a part of a recipe to be executed on the semiconductor processing system.

4. The method of claim 3, wherein the recipe comprises a pressure for the chamber and a gas characteristic.

5. The method of claim 3, wherein the operating conditions from the recipe are provided to the model to test an effect of the recipe on the plasma without requiring the recipe to first be executed by the semiconductor processing system.

6. The method of claim 1, wherein the model is trained to characterize the plasma at a specific pressure.

7. The method of claim 1, wherein the model is trained to characterize the plasma at a specific gas characteristic.

8. A non-transitory computer-readable medium comprising instructions that, when executed by one or more processors, cause the one or more processors to perform operations comprising:
    receiving operating conditions for a semiconductor process, wherein the semiconductor process is configured to generate a plasma inside of a chamber of a semiconductor processing system;
    providing the operating conditions for the semiconductor process as inputs to a model, wherein the model has been trained to characterize plasmas in the chamber using training data comprising operating characteristics from previous semiconductor processes executed on the semiconductor processing system, wherein the training data is labeled by determining whether a corresponding Radio Frequency (RF) voltage is in a linear region or in a flat region as a function of RF power; and
    generating, using the model, a characterization of the plasma in the chamber resulting from the operating conditions of the semiconductor process, wherein the characterization of the plasma results in a feedback signal that alters the operating conditions of the semiconductor process.

9. The non-transitory computer-readable medium of claim 8, wherein:
the operating conditions of the semiconductor process comprise a Radio Frequency (RF) power output for an RF generator configured to provide RF power to the plasma in the chamber; and
the operations further comprise calculating an RF voltage based on the RF power output and an impedance from an impedance matching network.

10. The non-transitory computer-readable medium of claim 8, wherein the model comprises a K-Nearest Neighbor model.

11. The non-transitory computer-readable medium of claim 8, wherein the training data is labeled with characterizations of resulting plasmas as viewed through a window in an insulator of the semiconductor processing system.

12. The non-transitory computer-readable medium of claim 8, wherein the training data is labeled based on measurements from an optical emission spectrometer.

13. The non-transitory computer-readable medium of claim 8, wherein determining whether a corresponding RF voltage is in a linear region or in a flat region comprises:
providing an Alternating Current (AC) signal comprising a frequency with the RF power; and
determining whether the frequency is present in the RF voltage.

14. A system comprising:
one or more processors; and
one or more memory devices comprising instructions that, when executed by the one or more processors, cause the one or more processors to perform operations comprising:
receiving operating conditions for a semiconductor process, wherein the semiconductor process is configured to generate a plasma inside of a chamber of a semiconductor processing system;
providing the operating conditions for the semiconductor process as inputs to a model, wherein the model has been trained to characterize plasmas in the chamber using training data comprising operating characteristics from previous semiconductor processes executed on the semiconductor processing system, wherein the training data is labeled by determining whether a corresponding Radio Frequency (RF) voltage is in a linear region or in a flat region as a function of RF power; and
generating, using the model, a characterization of the plasma in the chamber resulting from the operating conditions of the semiconductor process, wherein the characterization of the plasma results in a feedback signal that alters the operating conditions of the semiconductor process.

15. The system of claim 14, wherein the operating conditions are provided to the model from a log from a previous execution of the semiconductor process on the semiconductor processing system.

16. The system of claim 15, wherein the characterization of the plasma indicates whether the plasma was a cause of a wafer failure during the previous execution of the semiconductor process on the semiconductor processing system.

17. The system of claim 14, wherein the operating conditions are provided to the model from real-time sensor measurements as the semiconductor process is executed on the semiconductor processing system.

* * * * *